United States Patent
Ai et al.

(10) Patent No.: US 10,410,397 B2
(45) Date of Patent: Sep. 10, 2019

(54) PICTURE PRESENTATION METHOD AND APPARATUS

(71) Applicant: Baidu Online Network Technology (Beijing) Co., Ltd., Beijing (CN)

(72) Inventors: Rui Ai, Beijing (CN); Tangwu Du, Beijing (CN); Zhaoyan Jiang, Beijing (CN); Li Liu, Beijing (CN); Xianpeng Lang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/301,356

(22) PCT Filed: Dec. 28, 2015

(86) PCT No.: PCT/CN2015/099164
§ 371 (c)(1),
(2) Date: Sep. 30, 2016

(87) PCT Pub. No.: WO2016/155377
PCT Pub. Date: Oct. 6, 2016

(65) Prior Publication Data
US 2017/0186212 A1    Jun. 29, 2017

(30) Foreign Application Priority Data
Mar. 31, 2015    (CN) .......................... 2015 1 0150163

(51) Int. Cl.
*G06T 15/20* (2011.01)
*G06T 19/00* (2011.01)
(Continued)

(52) U.S. Cl.
CPC ............ *G06T 15/005* (2013.01); *G06F 16/54* (2019.01); *G06F 16/5866* (2019.01);
(Continued)

(58) Field of Classification Search
None
See application file for complete search history.

(56) References Cited

U.S. PATENT DOCUMENTS

| 6,094,198 A | 7/2000 | Shashua |
| 2003/0198377 A1 | 10/2003 | Ng |

(Continued)

FOREIGN PATENT DOCUMENTS

| CN | 101339646 A | 1/2009 |
| CN | 101763632 A | 6/2010 |

(Continued)

OTHER PUBLICATIONS

Stanco, Filippo; Battiato, Sebastiano; Gallo, Giovanni, Digital Imaging for Cultural Heritage Preservation: Analysis, Restoration, and Reconstruction of Ancient Artworks, CRC Press, 2011 ProQuest Ebook Central, Chapter 5, pp. 127-157.

(Continued)

*Primary Examiner* — Peter Hoang
(74) *Attorney, Agent, or Firm* — Ice Miller LLP (57) ABSTRACT

The present application discloses a picture presentation method and apparatus. A specific implementation of the method includes: acquiring an original picture set encompassing a same scene; selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points; selecting a to-be-presented picture set from the reconstruction picture set, a number of the three-dimensional feature points included in the to-be-presented picture set being above a preset threshold; determining a presentation order of to-be-presented pictures in the to-be-presented picture set, and generating a picture presentation (Continued)

sequence based on the presentation order of the to-be-presented pictures; and presenting pictures in the picture presentation sequence continuously. By acquiring pictures encompassing a same scene, determining a presentation order of the pictures based on the association relationship between the pictures, and continuously presenting the pictures according to the presentation order, this implementation improves the spatial continuity of the scene in the pictures when the pictures are presented.

17 Claims, 5 Drawing Sheets

(51) Int. Cl.
  *G06T 15/00* (2011.01)
  *G06F 16/951* (2019.01)
  *G06F 16/58* (2019.01)
  *G06F 16/54* (2019.01)

(52) U.S. Cl.
  CPC .......... *G06F 16/951* (2019.01); *G06T 15/205* (2013.01); *G06T 19/003* (2013.01)

(56) References Cited

U.S. PATENT DOCUMENTS

| | | |
|---|---|---|
| 2004/0236791 A1 | 11/2004 | Kinjo |
| 2006/0017820 A1 | 1/2006 | Kim |
| 2010/0284607 A1* | 11/2010 | Van Den Hengel .... G06T 7/564 382/154 |
| 2011/0098056 A1* | 4/2011 | Rhoads ................. G01C 21/20 455/456.1 |
| 2012/0308090 A1 | 12/2012 | Sukegawa et al. |
| 2014/0160117 A1* | 6/2014 | Nehmadi .............. G06F 3/0304 345/419 |
| 2014/0218353 A1* | 8/2014 | Solem .................... G06T 19/20 345/419 |
| 2015/0036931 A1* | 2/2015 | Loui ...................... G06K 9/46 382/195 |
| 2015/0070352 A1* | 3/2015 | Jones ...................... G06T 7/75 345/420 |

FOREIGN PATENT DOCUMENTS

| | | |
|---|---|---|
| CN | 101877143 A | 11/2010 |
| CN | 101916456 A | 12/2010 |
| CN | 103759670 A | 4/2014 |
| CN | 104200523 A | 12/2014 |
| JP | 2009237848 | 10/2009 |
| KR | 20080029080 | 4/2008 |
| KR | 20090103445 | 10/2009 |

OTHER PUBLICATIONS

Snavely, Noah; Seitz, Steven M. and Szeliski, Richard, Photo Tourism: Exploring Photo Collections in 3D, Association for Computing Machinery, Inc., 2006, pp. 835-846.

* cited by examiner

PICTURE PRESENTATION METHOD AND APPARATUS

CROSS-REFERENCE TO RELATED APPLICATIONS

The present application is a U.S. national stage of, and claims the priority benefit of, International Patent Application Ser. No. PCT/CN2015/099164, filed Dec. 28, 2015 and Chinese Patent Application Ser. No. 201510150163.2, filed Mar. 31, 2015, the text and drawings of which are hereby incorporated by reference in their entireties.

TECHNICAL FIELD

The present application relates to the field of computer technology, specifically to the field of image processing, and more specifically to a picture presentation method and apparatus.

BACKGROUND

Currently, multiple user-shared pictures showing the same scene (for example, photographs taken by someone at a tourist attraction) are presented in some applications to enhance the association between the user-shared pictures, thereby improving user experience. In the existing art, after acquiring user uploaded pictures, pictures having the same scene are placed together randomly. Therefore, the scene presented in the images is monotonous and cannot reflect the characteristics of the scene in the pictures on the whole, hence causing the content of the scene expressed by the images being not sufficiently rich, and affecting the user experience when browsing pictures.

SUMMARY

The present application provides a picture presentation method and apparatus, so as to solve the technical problem mentioned in the Background section.

According to a first aspect, the present application provides a picture presentation method, comprising: acquiring an original picture set encompassing the same scene; selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points; selecting a to-be-presented picture set from the reconstruction picture set, a number of the three-dimensional feature points included in the to-be-presented picture set being above a preset threshold; determining a presentation order of to-be-presented pictures in the to-be-presented picture set, and generating a picture presentation sequence based on the presentation order of the to-be-presented pictures; and presenting pictures in the picture presentation sequence continuously.

According to a second aspect, the present application provides a picture presentation apparatus, comprising: an acquiring module for acquiring an original picture set encompassing the same scene; a reconstruction module for selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points; a selection module for selecting a to-be-presented picture set from the reconstruction picture set, a number of the three-dimensional feature points included in the to-be-presented picture set being above a preset threshold; a determining module for determining a presentation order of to-be-presented pictures in the to-be-presented picture set, and generating a picture presentation sequence based on the presentation order of the to-be-presented pictures; and a presentation module for presenting pictures in the picture presentation sequence continuously.

The picture presentation method and apparatus provided by the present application, by acquiring pictures encompassing the same scene, determining the presentation order of the pictures based on the association relationship between the pictures, and presenting the pictures according to the presentation order continuously, improve the spatial continuity of the scene in the pictures when the pictures are presented, thereby enriching the content of the scene expressed by the pictures; and by inserting transition pictures between the pictures, achieve a smooth transition in the process of continuously presenting the scene in the pictures in space.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
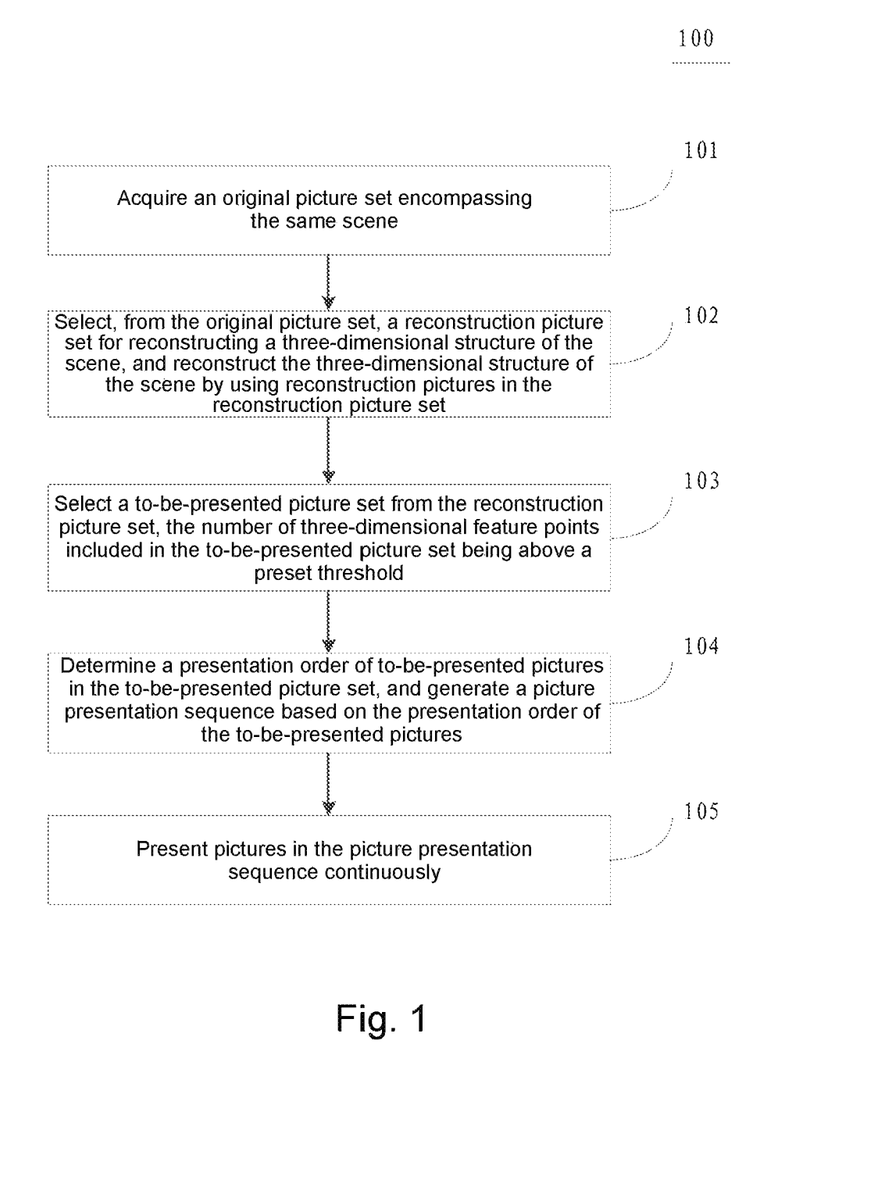
FIG. 1 is a flow chart of a picture presentation method according to an embodiment of the present application.

Referring to FIG. 1, a flow 100 of a picture presentation method according to an embodiment of the present application is shown. The method includes the following steps:

Step 101: Acquire an original picture set encompassing the same scene.

In this embodiment, original pictures encompassing the same scene (for example, a tourist attraction) maybe user generated content (UGC) pictures shared by a user. In one implementation, original pictures encompassing the same scene may be acquired by actively retrieving pictures from different websites. For example, original pictures the names of which include the name of the same tourist attraction may be retrieved from different websites, thus acquiring original pictures including the same tourist attraction.

In some optional implementations of this embodiment, acquiring the original picture set encompassing the same scene includes: receiving a scene selection instruction, the scene selection instruction including geographical location information corresponding to the scene; and acquiring, based on the geographical location information, the original picture set corresponding to the geographical location information. First, a plurality of pictures of different scenes (for example, tourist attractions) may be presented to a user. A scene that the user expects to browse may be determined based on a picture selection operation (for example, a click operation) of the user. After the scene that the user expects to browse is determined, address information corresponding to the scene is further determined. The correlation between scenes and address information of the scenes may be established in advance. After the address information of the scene is determined, shooting position information recorded in original information may be matched with the address information of the scene, and pictures, the shooting position information of which records a shooting position that is consistent with the address information of the scene, are selected. Thereby, original pictures encompassing the same scene are selected.

In some optional implementations of this embodiment, the method further includes, after acquiring the original picture set encompassing the same scene: performing a preprocessing operation on the original picture set, wherein the preprocessing operation includes at least any one of: filtering out the original pictures having a image quality lower than a preset value from the original picture set; and correcting shooting positions of the original pictures in the original picture set to a normal shooting attitude.

A filtering operation maybe performed on the original pictures based on the Exchangeable Image File (EXIF) information in the pictures, so as to filter out pictures with poor image quality. In addition, an image correction operation may be performed on the original pictures, that is, a rotation operation may be performed on images in the original pictures, so as to adjust the images to a normal shooting attitude. Pictures having a low degree of association with the reconstruction of the three-dimensional structure of the scene may be removed by means of picture selection.

Step 102: Select, from the original picture set, a reconstruction picture set for reconstructing a three-dimensional structure of the scene, and reconstruct the three-dimensional structure of the scene by using reconstruction pictures in the reconstruction picture set.

In this embodiment, after the original pictures encompassing the same scene are acquired, the three-dimensional structure of the scene maybe reconstructed by using the original pictures encompassing the same scene. A certain number of feature points maybe selected from each of the original pictures encompassing the same scene, for reconstructing the three-dimensional structure of the scene. The feature points may be points used for representing the contour of the scene in the original picture. Taking the tourist attraction Longmen Grottoes as an example of the scene in the original picture, the feature points may be points used for representing the contour of the scene in the original picture, and the feature points may be selected from the contours of a plurality of objects of a Buddha sculpture (for example, the face, eyes and hands of the Buddha sculpture) in Longmen Grottoes. After the three-dimensional structure of the scene is reconstructed by using the feature points, the three-dimensional structure of the scene may be presented in an interface through which the user browses UGC pictures. In addition, shooting positions of the pictures used for synthesizing the three-dimensional structure of the scene may be marked at corresponding positions of the three-dimensional structure of the scene, thereby further improving the degree of association between the pictures and the scene.

In some optional implementations of this embodiment, selecting, from the original picture set, the reconstruction picture set for reconstructing the three-dimensional structure of the scene includes: extracting scale-invariant feature transform (SIFT) keypoints in original pictures in the original picture set; and selecting, from the original picture set, the reconstruction picture set for reconstructing the three-dimensional structure of the scene based on a matching relationship between SIFT keypoints in the original pictures.

Optionally, reconstruction pictures used for reconstructing the three-dimensional structure of the scene may be selected from the original pictures based on SIFT keypoints of the original pictures. First, it may be determined, based on a matching relationship between the SIFT keypoints of the original pictures, whether there is an association relationship between the original pictures. The above-mentioned process is described below by taking an approach of determining whether an original picture has an association relationship with other original pictures as an example. The approach of determining whether the original picture has an association relationship with other original pictures may be as follows: match SIFT keypoints of the original picture and those of other original pictures(for example, by calculating an Euclidean distance between two feature points), and determine the number of matching SIFT keypoints between the pictures. When the number of matching SIFT keypoints is above a preset threshold, it may be determined that the original picture has an association relationship with other original pictures. Based on the above-mentioned approach, it may be respectively determined whether each of a plurality of original pictures has an association relationship with other original pictures.

For example, a K-D tree data structure representing the association relationship between original pictures may be established first, each original picture being represented by one node in the K-D tree. The association relationship between nodes may be obtained by using the K-D tree data structure, so that the association relationship between the original pictures corresponding to the nodes can be determined.

After the association relationship between the original pictures is determined, pictures (also referred to as reconstruction pictures) used for reconstructing the three-dimensional structure of the scene may be selected based on the original pictures having the association relationship. For example, a graph data structure is used, wherein each of the original pictures having the association relationship is represented by one node in the graph data structure, and the association relationship between the original pictures may be represented by a connecting line. A subgraph having the largest number of nodes may be selected from a plurality of subgraphs representing a connection relationship between nodes. Original pictures corresponding to the nodes in the subgraph are used as the reconstruction pictures used for reconstructing the three-dimensional structure of the scene.

In some optional implementations of this embodiment, reconstructing the three-dimensional structure of the scene by using reconstruction pictures in the reconstruction picture set, the three-dimensional structure of the scene including three-dimensional feature points includes:

restoring a camera parameter based on SIFT keypoints in the reconstruction pictures in the reconstruction picture set, the camera parameter including an intrinsic camera parameter and an extrinsic camera parameter, and the intrinsic camera parameter including a focal length and a principal point offset; and reconstructing the three-dimensional structure of the scene based on the SIFT keypoints in the reconstruction pictures and the camera parameter. The principal point offset may be: a distance from the central point of the picture to an intersection between a primary axis of a camera lens and a plane in which a sensor array of the camera is located. The extrinsic camera parameter may be used for representing the rotation and translation of a coordinate system of the camera with respect to the world coordinate system. The extrinsic camera parameter may be determined based on the intrinsic camera parameter.

Optionally, in the process of restoring the camera parameter based on the SIFT keypoints in the reconstruction pictures in the reconstruction picture set, the restored camera parameter may be optimized. The extrinsic camera parameter may be preferentially optimized.

Step 103: Select a to-be-presented picture set from the reconstruction picture set, the number of three-dimensional feature points included in the to-be-presented picture set being above a preset threshold.

In this embodiment, after the three-dimensional structure of the scene is reconstructed, some pictures (also referred to as to-be-presented pictures) to be presented to the user may be selected from the pictures (also referred to as reconstruction pictures) used for reconstructing the three-dimensional structure of the scene. In this embodiment, a plurality of to-be-presented pictures may be selected from the reconstruction pictures. The selected plurality of to-be-presented pictures may be pictures satisfying the following condition: different feature points between the selected plurality of to-be-presented pictures can cover the reconstructed three-dimensional structure of the scene. Because the feature points of the to-be-presented pictures are used for reconstructing the three-dimensional structure of the scene, the correlations between the feature points of the plurality of to-be-presented pictures and the three-dimensional feature points of the three-dimensional structure of the scene may be determined. When different feature points between the selected plurality of to-be-presented pictures can cover the reconstructed three-dimensional structure of the scene, the to-be-presented pictures can express more abundant content of the scene, that is, the to-be-presented pictures can present the scene from multiple angles.

In some optional implementations of this embodiment, step 103 may include: selecting a reference to-be-presented picture from the reconstruction picture set, the number of three-dimensional feature points included in the reference to-be-presented picture being greater than the number of three-dimensional feature points included in any other reconstruction picture in the reconstruction picture set; and selecting a plurality of to-be-subsequently-presented pictures satisfying a first preset condition in sequence from the reconstruction pictures by using the reference to-be-presented picture. The first preset condition includes: the number of different three-dimensional feature points between the to-be-subsequently-presented picture and a to-be-subsequently-presented picture previously selected is greater than the number of different three-dimensional feature points between a reconstruction picture that is not selected as the to-be-subsequently-presented picture and the to-be-subsequently-presented picture previously selected.

Optionally, the three-dimensional feature point included in the to-be-presented picture may be a SIFT keypoint that corresponds to the three-dimensional feature point and that participates in the reconstruction of the three-dimensional structure of the scene. The SIFT keypoint may be a matching SIFT keypoint between the reconstruction pictures. When the three-dimensional structure of the scene is reconstructed by using the matching SIFT keypoints between the reconstruction pictures, there is a correlation between the SIFT keypoints and the three-dimensional feature points of the three-dimensional structure of the scene.

The process of selecting the to-be-presented pictures is described below by taking one object (for example, a Buddha sculpture eye object) in a scene (e.g., Longmen Grottoes) in a plurality of reconstruction pictures as an example. First, a picture including the largest number of three-dimensional feature points maybe selected from the reconstruction pictures as the first picture that is selected as the to-be-presented picture. Then, the second picture that is selected as the to-be-presented picture needs to satisfy the following condition: compared with other reconstruction pictures, the second picture includes the largest number of different three-dimensional feature points from the first to-be-presented picture. Based on the above-mentioned principle, the to-be-presented pictures are selected in sequence, until the number of three-dimensional feature points included in the to-be-presented pictures reaches a threshold, that is, the number of different three-dimensional feature points included in the to-be-presented picture set is above a preset threshold.

Step 104: Determine a presentation order of to-be-presented pictures in the to-be-presented picture set, and generate a picture presentation sequence based on the presentation order of the to-be-presented pictures.

In this embodiment, after the to-be-presented pictures to be presented to the user are determined, the presentation order of the to-be-presented pictures may be determined. Then, the to-be-presented pictures are presented to the user according to the presentation order. The presentation order of the to-be-presented pictures maybe determined based on information related to the to-be-presented pictures, e.g., the shooting positions and the shooting angles of the to-be-presented pictures.

In some optional implementations of this embodiment, determining the presentation order of the to-be-presented pictures in the to-be-presented picture set, and generating the picture presentation sequence based on the presentation order of the to-be-presented pictures includes: determining the presentation order of the to-be-presented pictures based on an association relationship between attribute parameters of the to-be-presented pictures, the attribute parameter of the to-be-presented picture including a shooting position parameter and a shooting angle parameter; and generating the picture presentation sequence based on the presentation order of the to-be-presented pictures.

The process of determining the presentation order of the to-be-presented pictures is illustrated below by taking the determining of the presentation order of the to-be-presented pictures based on the shooting position and shooting angle parameters of the to-be-presented pictures as an example. For example, the order of the to-be-presented pictures may be determined in the following way: The to-be-presented pictures maybe sorted in a descending order of distances of the shooting positions of the to-be-presented pictures to the scene (for example, Longmen Grottoes), so as to determine the presentation order of the to-be-presented pictures, that is, a presentation order from far away from Longmen Grottoes to near Longmen Grottoes. In this way, the to-be-presented pictures can present the scene in the pictures to the user from far to near, so that the scene in the pictures has spatial continuity, thereby further enriching the content expressed by the pictures.

In addition, the presentation order of the to-be-presented pictures may alternatively be determined based on the shooting angles. For example, the presentation order of the to-be-presented pictures is determined in an ascending order of offsets of the shooting angles with respect to the axis of the scene (for example, Longmen Grottoes). In this way, the to-be-presented pictures can present the scene in the pictures to the user from different viewing angles, so that the scene in the pictures has spatial continuity.

It should be noted that the presentation order of the to-be-presented pictures may be determined by combining the related information used in the above-mentioned processes of determining the presentation order of the to-be-presented pictures. For example, the presentation order of the to-be-presented pictures is determined based on the shooting positions and shooting angles of the to-be-presented pictures. In addition, different weight values may be set for attribute parameters such as the shooting position and the shooting angle, and the final presentation order is determined based on the weight values.

Step 105: Present pictures in the picture presentation sequence continuously.

In this embodiment, after the presentation order of the to-be-presented pictures is determined, the pictures in the picture presentation sequence may be continuously presented in sequence. When the pictures in the picture sequence are continuously presented, each picture may be rotated, so as to present the scene in the pictures from multiple angles, thereby enriching the content of the scene expressed by the picture.

The picture presentation method provided by the above-mentioned embodiment of the present application, by acquiring pictures encompassing the same scene, determining the presentation order of the pictures based on the association relationship between the pictures, and presenting the pictures according to the presentation order continuously, improve the spatial continuity of the scene in the pictures when the pictures are presented, thereby enriching the content of the scene expressed by the pictures; and by inserting transition pictures between the pictures, achieve a smooth transition in the process of continuously presenting the scene in the pictures in space.

Figure 2:
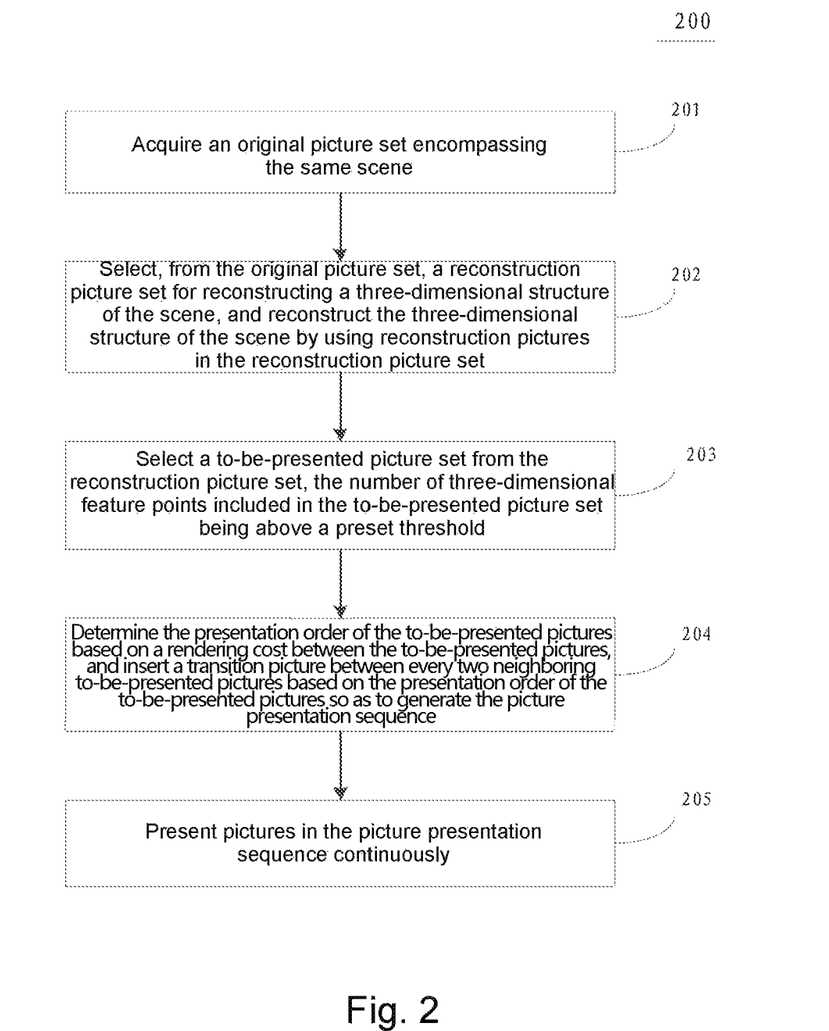
FIG. 2 is a flow chart of a picture presentation method according to another embodiment of the present application.

Referring to FIG. 2, a flow 200 of a picture presentation method according to another embodiment of the present application is shown. The method includes the following steps:

Step 201: Acquire an original picture set encompassing the same scene.

Step 202: Select, from the original picture set, a reconstruction picture set for reconstructing a three-dimensional structure of the scene, and reconstruct the three-dimensional structure of the scene by using reconstruction pictures in the reconstruction picture set.

Step 203: Select a to-be-presented picture set from the reconstruction picture set, the number of three-dimensional feature points included in the to-be-presented picture set being above a preset threshold.

Step 204: Determine the presentation order of the to-be-presented pictures based on a rendering cost between the to-be-presented pictures, and insert a transition picture between every two neighboring to-be-presented pictures based on the presentation order of the to-be-presented pictures so as to generate the picture presentation sequence.

In this embodiment, after the to-be-presented pictures are determined, the presentation order of the to-be-presented pictures is determined based on the rendering cost between the to-be-presented pictures, and when the to-be-presented pictures are continuously presented, transition pictures (also referred to as virtual pictures) may be inserted between the to-be-presented pictures, so that a smooth presentation process is formed when the to-be-presented pictures are continuously presented, thereby achieving a smooth transition.

Figure 3:
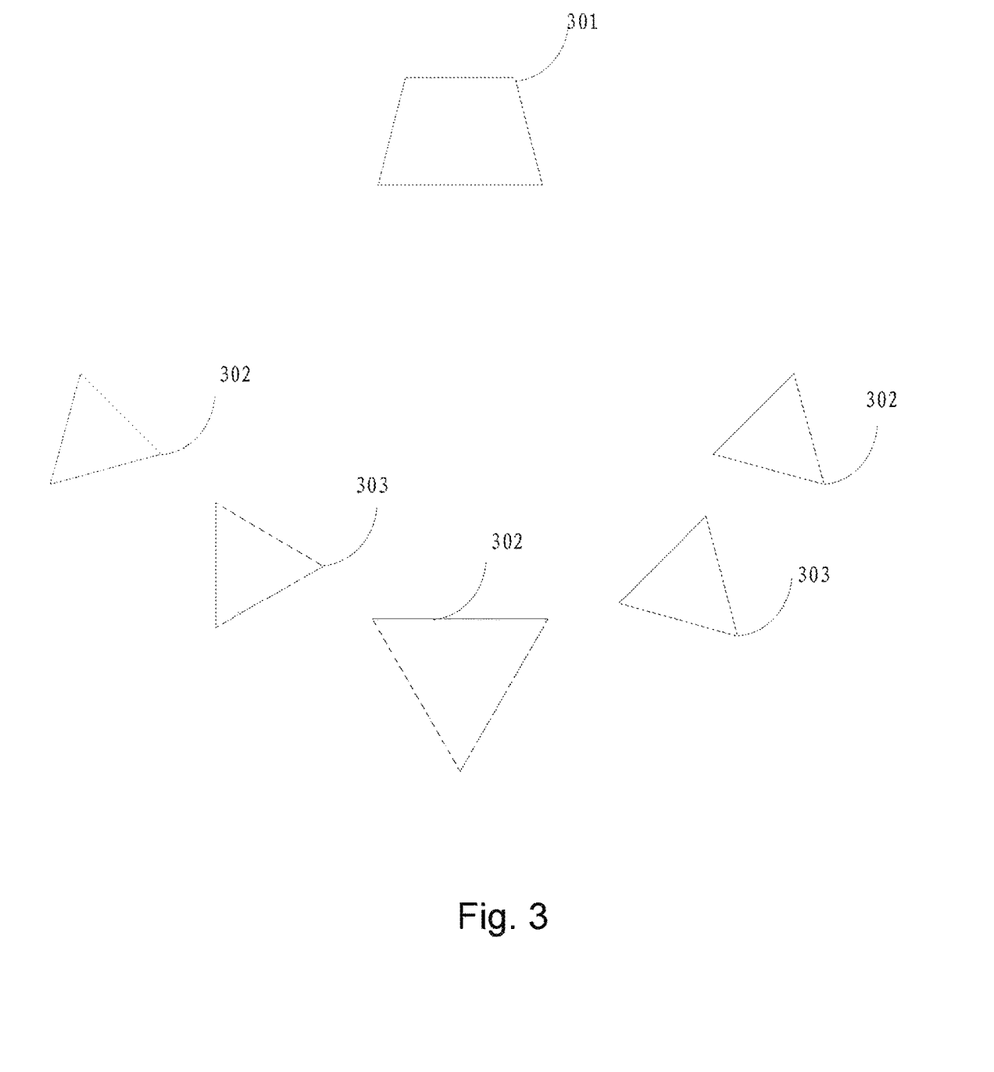
FIG. 3 is an exemplary principle diagram of inserting a transition picture in the picture presentation method according to the present application.

Referring to FIG. 3, an exemplary principle diagram of inserting a transition picture in the picture presentation method according to the present application is shown. FIG. 3 shows a scene object 301, to-be-presented pictures 302, and transition pictures 303 located between the to-be-presented picture 302. In this embodiment, the insertion of the transition pictures 303 between the to-be-presented pictures 302 may be referred to as a rendering process. The transition pictures 303 inserted between the to-be-presented pictures are generated based on the to-be-presented pictures. In addition, the insertion of the transition picture 303 between different to-be-presented pictures 302 corresponds to different rendering costs. The presentation order of the to-be-presented pictures may be determined based on the rendering costs between the to-be-presented pictures. In this way, the insertion of the transition pictures between the to-be-presented pictures can be implemented at low rendering costs, thereby achieving a smooth transition effect.

In some optional implementations of this embodiment, the method further includes, before determining the presentation order of the to-be-presented pictures based on the rendering cost between the to-be-presented pictures: calculating, based on rendering-related parameters of the to-be-presented pictures, a rendering sub-cost corresponding to each of the rendering-related parameters, the rendering-related parameters including at least one of: an amount-of-twist parameter, a shooting position parameter, a shooting angle parameter, a resolution parameter, and an optical flow parameter; and determining the rendering cost between the to-be-presented pictures based on the rendering sub-cost corresponding to each of the rendering-related parameters.

In this embodiment, the amount-of-twist parameter in the rendering-related parameters is used for representing an amount of deformation that is generated, in the process of inserting a transition picture 303 between two to-be-presented pictures 302, when three-dimensional feature points included in the to-be-presented pictures 302 are mapped to an imaging plane of a virtual camera.

Optionally, a rendering sub-cost corresponding to an amount of twist between neighboring to-be-presented pictures 302 may be determined based on the change in angle of the to-be-presented pictures 302 changing from a rectangle to a non-polygon when three-dimensional feature points included in the to-be-presented pictures 302 are mapped to the imaging plane of the virtual camera. A rendering sub-cost corresponding to the shooting position parameter may be determined based on coordinates of the shooting positions of the to-be-presented pictures 302. For example, coordinates of the shooting positions of two neighboring to-be-presented pictures 302 are (X1, Y1, Z1) and (X2, Y2, Z2) respectively, the rendering sub-cost corresponding to the shooting position parameter may be calculated by using a formula $$\sqrt{(X1-X2)*(X1-X2)+(Y1-Y2)*(Y1-Y2)+(Z1-Z2)*(Z1-Z2)}.$$

A rendering sub-cost corresponding to the shooting angle parameter may be determined by calculating the absolute value of a difference between shooting angles of neighboring to-be-presented pictures 302. A rendering sub-cost corresponding to the optical flow parameter may be determined based on pixels positions, in two photographs, of matching SIFT keypoints between neighboring to-be-presented pictures. For example, matching SIFT keypoints between two neighboring to-be-presented pictures may form a feature point pair, with pixel coordinates respectively represented by (Xi1, Yi1) and (Xi2,Yi2), where i represents the position of the matching feature point pair in a plurality of matching SIFT keypoint pairs. In this case, the rendering sub-cost corresponding to the optical flow parameter may be calculated by using the following formula:

$$\sum_{i=1}^{n}\sqrt{(Xi1-Xi2)*(Xi1-Xi2)+(Yi1-Yi2)*(Yi1-Yi2)}.$$

A rendering sub-cost corresponding to the resolution parameter may be determined based on an imaging range of three-dimensional points in a plane of the camera.

Optionally, after the rendering sub-costs corresponding to the above-mentioned parameters are determined, the rendering sub-cost corresponding to each parameter may be normalized to a range of 0 to 1.

In one implementation, during normalization, different weight values may be set for the parameters. For example, a large weight value is set for the amount-of-twist parameter, a medium weight value is set for the shooting position parameter and shooting angle parameter, and a small weight value is set for the optical flow parameter and the resolution parameter. Based on the above-mentioned setting of the weight values, the occurrence of excessively large image change and zooming phenomenon can be avoided. In this way, the rendering cost between the to-be-rendered pictures can be determined based on the weight values of the parameters and the normalized rendering sub-cost values. After the rendering costs between each to-be-presented picture and other to-be-presented pictures are determined, a graph data structure may be used. Each to-be-presented picture is represented by one node in the graph, and values of rendering costs between nodes may be represented by a weight value for a connecting line between the nodes. By using a shortest path algorithm such as Dijkstra's algorithm, a path corresponding to the smallest value of the sum of weight values for the connecting lines of a plurality of nodes maybe calculated based on the weight values for the connecting lines of nodes, and the path may be determined as a path representing the order of the to-be-presented pictures. An order corresponding to the nodes on the path is the presentation order of the to-be-presented pictures.

In some optional implementations of this embodiment, inserting the transition picture between every two neighboring to-be-presented pictures based on the presentation order of the to-be-presented pictures so as to generate the picture presentation sequence includes: inserting a virtual camera at at least one position between shooting positions of every two neighboring to-be-presented pictures based on the presentation order of the to-be-presented pictures, and performing an interpolation operation on the intrinsic camera parameter to obtain an intrinsic parameter of the virtual camera, the virtual camera including a virtual-camera imaging plane; and mapping, based on the intrinsic parameter of the virtual camera, three-dimensional feature points included in every two neighboring to-be-presented pictures to the virtual-camera imaging plane for inserting the transition picture, and generating the picture presentation sequence.

Step 205: Present pictures in the picture presentation sequence continuously.

In this embodiment, after the presentation order of the to-be-presented pictures is determined, the pictures in the picture presentation sequence may be continuously presented in sequence. In the process of continuously presenting the pictures in the picture sequence, transition pictures are inserted between the to-be-presented pictures in the presentation sequence, that is, virtual cameras are inserted between the to-be-presented pictures, and the three-dimensional feature points included in the to-be-presented pictures are mapped to virtual imaging planes of the virtual cameras based on relationships between camera parameters of the virtual cameras and camera parameters of real cameras corresponding to the to-be-presented pictures. In this way, the insertion of transition pictures is implemented while continuously presenting the to-be-presented pictures in the presentation sequence, thereby achieving a smooth transition during picture presentation.

Figure 4:
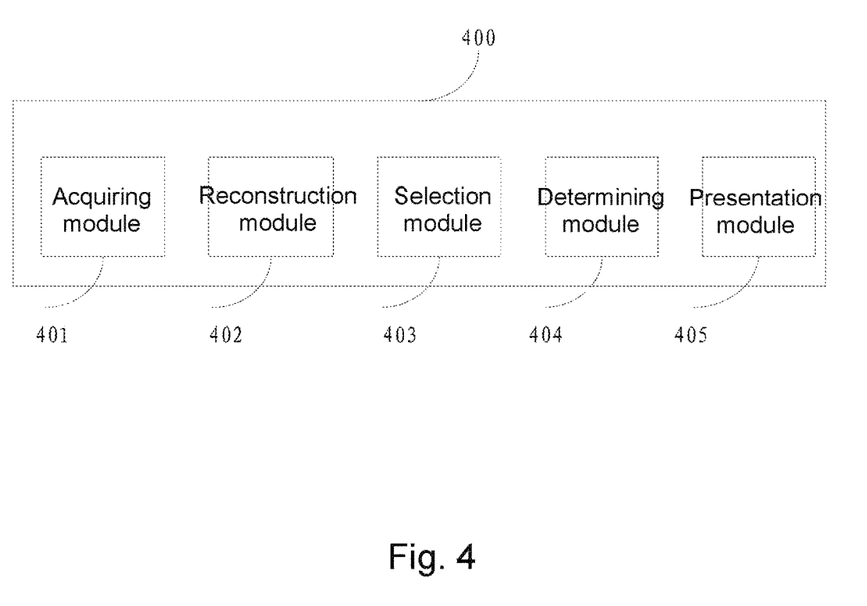
FIG. 4 is a schematic structural diagram of a picture presentation apparatus according to an embodiment of the present application.

Referring to FIG. 4, a schematic structural diagram of a picture presentation apparatus according to an embodiment of the present application is shown. The picture presentation apparatus 400 includes an acquiring module 401 for acquiring an original picture set encompassing the same scene; a reconstruction module 402 for selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene including three-dimensional feature points; a selection module 403 for selecting a to-be-presented picture set from the reconstruction picture set, the number of three-dimensional feature points included in the to-be-presented picture set being above a preset threshold; a determining module 404 for determining a presentation order of to-be-presented pictures in the to-be-presented picture set, and generating a picture presentation sequence based on the presentation order of the to-be-presented pictures; and a presentation module 405 for presenting pictures in the picture presentation sequence continuously.

In some optional implementations of this embodiment, the reconstruction module 402 further includes a reconstruction picture selection submodule. The reconstruction picture selection submodule is used for extracting SIFT keypoints in original pictures in the original picture set; and is further used for selecting, from the original picture set, the reconstruction picture set for reconstructing the three-dimensional structure of the scene based on a matching relationship between SIFT keypoints in the original pictures.

In some optional implementations of this embodiment, the reconstruction module 402 further includes a scene reconstruction submodule. The scene reconstruction submodule is used for restoring a camera parameter based on SIFT keypoints in the reconstruction pictures in the reconstruction picture set, the camera parameter includes an intrinsic camera parameter and an extrinsic camera parameter, and the intrinsic camera parameter includes a focal length and a principal point offset. The scene reconstruction submodule is further used for reconstructing the three-dimensional structure of the scene based on the SIFT keypoints in the reconstruction pictures and the camera parameter.

In some optional implementations of this embodiment, the selection module 403 is used for selecting a reference to-be-presented picture from the reconstruction picture set, and the number of three-dimensional feature points included in the reference to-be-presented picture is greater than the number of three-dimensional feature points included in any other reconstruction picture in the reconstruction picture set. The selection module 403 is further used for selecting a plurality of to-be-subsequently-presented pictures satisfying a first preset condition in sequence from the reconstruction picture set by using the reference to-be-presented picture, and the first preset condition includes: the number of different three-dimensional feature points between the to-be-subsequently-presented picture and a to-be-subsequently-presented picture previously selected is greater than the number of different three-dimensional feature points between a reconstruction picture that is not selected as a to-be-subsequently-presented picture and the to-be-subsequently-presented picture previously selected.

In some optional implementations of this embodiment, the determining module 404 is used for determining the presentation order of the to-be-presented pictures based on an association relationship between attribute parameters of the to-be-presented pictures, the attribute parameter of the to-be-presented picture including a shooting position parameter and a shooting angle parameter; and generating the picture presentation sequence based on the presentation order of the to-be-presented pictures.

In some optional implementations of this embodiment, the determining module 404 is further used for determining the presentation order of the to-be-presented pictures based on a rendering cost between the to-be-presented pictures, and the rendering cost indicates the cost for inserting a transition picture between the to-be-presented pictures. The determining module 404 is further used for inserting a transition picture between every two neighboring to-be-presented pictures based on the presentation order of the to-be-presented pictures so as to generate the picture presentation sequence.

In some optional implementations of this embodiment, the determining module 404 includes a rendering cost determining submodule, wherein the rendering cost determining submodule is used for calculating, based on rendering-related parameters of the to-be-presented pictures, a rendering sub-cost corresponding to each of the rendering-related parameters, and the rendering-related parameters includes at least one of: an amount-of-twist parameter, a shooting position parameter, a shooting angle parameter, a resolution parameter, and an optical flow parameter. The rendering cost determining submodule is further used for determining the rendering cost between the to-be-presented pictures based on the rendering sub-cost corresponding to each of the rendering-related parameters.

In some optional implementations of this embodiment, the determining module 404 includes a transition picture insertion submodule, wherein the transition picture insertion submodule is used for inserting a virtual camera at least one position between shooting positions of every two neighboring to-be-presented pictures based on the presentation order of the to-be-presented pictures, and performing an interpolation operation on the intrinsic camera parameter to obtain an intrinsic parameter of the virtual camera, and the virtual camera includes a virtual-camera imaging plane. The transition picture insertion submodule is further used for mapping, based on the intrinsic parameter of the virtual camera, three-dimensional feature points included in every two neighboring to-be-presented pictures to the virtual-camera imaging plane for inserting the transition picture, and generating the picture presentation sequence.

In some optional implementations of this embodiment, the acquiring module 401 is further used for receiving a scene selection instruction, the scene selection instruction including geographical location information corresponding to the scene; and acquiring, based on the geographical location information, the original picture set corresponding to the geographical location information.

In some optional implementations of this embodiment, the apparatus 400 further includes a preprocessing module, wherein the preprocessing module is used for performing a preprocessing operation on the original picture set; and the preprocessing module includes at least one of an image filtering submodule and an image correction submodule, wherein the image filtering submodule is used for filtering out, from the original picture set, original pictures having a image quality lower than a preset value; and the image correction submodule is used for correcting shooting positions of the original pictures in the original picture set.

Figure 5:
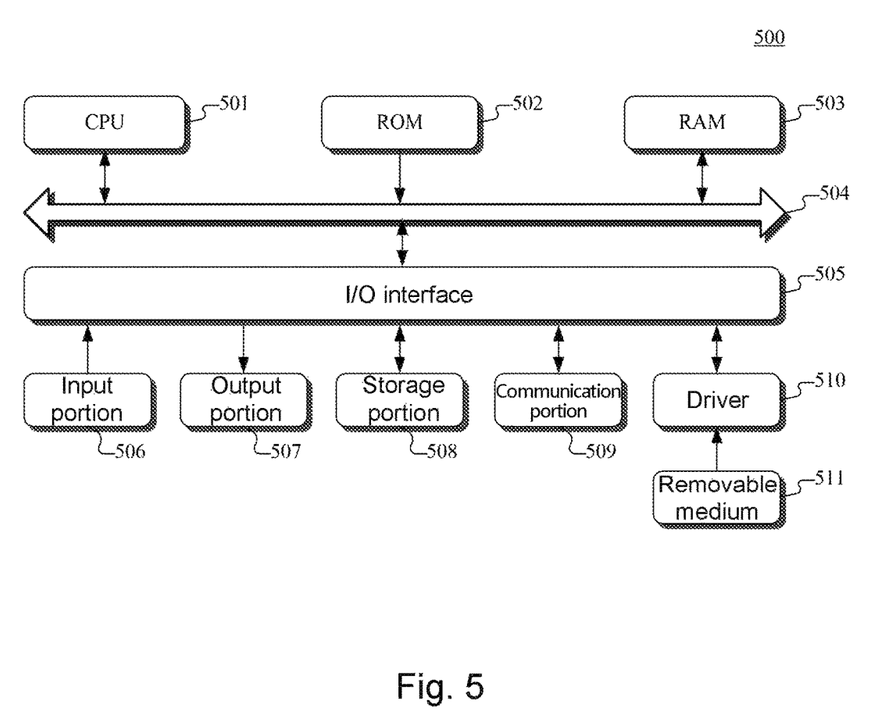
FIG. 5 is a schematic structural diagram of a computer system adapted to implement the present application.

FIG. 5 is a schematic structural diagram of a computer system provided by an embodiment of the present application.

Referring to FIG. 5, a schematic structural diagram of a computer system 500 adapted to implement a device of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to execute the method described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A picture presentation method, comprising:
   acquiring an original picture set encompassing a same scene;
   selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points;
   selecting a to-be-presented picture set from the reconstruction picture set, a number of the three-dimensional feature points included in the to-be-presented picture set being above a preset threshold;
   determining a presentation order of to-be-presented pictures in the to-be-presented picture set, and generating a picture presentation sequence based on the presentation order of the to-be-presented pictures; and
   presenting pictures in the picture presentation sequence continuously,
   wherein the selecting a to-be-presented picture set from the reconstruction picture set, a number of the three-dimensional feature points included in the to-be-presented picture set being above a preset threshold, comprises:
   selecting a reference to-be-presented picture from the reconstruction picture set, a number of three-dimensional feature points included in the reference to-be-presented picture being greater than a number of three-dimensional feature points included in any other reconstruction picture in the reconstruction picture set; and
   selecting a plurality of to-be-subsequently-presented pictures satisfying a first preset condition in sequence from the reconstruction picture set by using the reference to-be-presented picture, the first preset condition comprising: a number of different three-dimensional feature points included in the to-be-subsequently-presented picture and a to-be-subsequently-presented picture previously selected is greater than a number of different three-dimensional feature points included in a reconstruction picture that is not selected as a to-be-subsequently-presented picture and the to-be-subsequently-presented picture previously selected.

2. The method according to claim 1, wherein the selecting, from the original picture set, the reconstruction picture set for reconstructing the three-dimensional structure of the scene comprises:
   extracting scale-invariant feature transform (SIFT) keypoints in original pictures in the original picture set; and
   selecting, from the original picture set, the reconstruction picture set for reconstructing the three-dimensional structure of the scene based on a matching relationship between SIFT keypoints in the original pictures.

3. The method according to claim 2, wherein the reconstructing the three-dimensional structure of the scene by using the reconstruction pictures in the reconstruction picture set, the three-dimensional structure of the scene comprising three- dimensional feature points, comprises:
   restoring a camera parameter based on SIFT keypoints in the reconstruction pictures in the reconstruction picture set, the camera parameter comprising an intrinsic camera parameter and an extrinsic camera parameter, and the intrinsic camera parameter comprising a focal length and a principal point offset; and
   reconstructing the three-dimensional structure of the scene based on the SIFT keypoints in the reconstruction pictures and the camera parameter.

4. The method according to claim 1, wherein the determining the presentation order of the to-be-presented pictures in the to-be-presented picture set, and generating the picture presentation sequence based on the presentation order of the to-be-presented pictures comprises:
   determining the presentation order of the to-be-presented pictures based on an association relationship between attribute parameters of the to-be-presented pictures, the attribute parameter of the to-be-presented picture comprising a shooting position parameter and a shooting angle parameter; and
   generating the picture presentation sequence based on the presentation order of the to-be-presented pictures.

5. The method according to claim 1, wherein the determining the presentation order of the to-be-presented pictures in the to-be-presented picture set, and generating the picture presentation sequence based on the presentation order of the to-be-presented pictures comprises:

determining the presentation order of the to-be-presented pictures based on a rendering cost between the to-be-presented pictures, the rendering cost indicating a cost for inserting a transition picture between the to-be-presented pictures; and inserting a transition picture between every two neighboring to-be-presented pictures based on the presentation order of the to-be-presented pictures so as to generate the picture presentation sequence.

6. The method according to claim 5, wherein the method further comprises, before the determining the presentation order of the to-be-presented pictures based on the rendering cost between the to-be-presented pictures:

calculating, based on rendering-related parameters of the to-be-presented pictures, a rendering sub-cost corresponding to each of the rendering-related parameters, the rendering-related parameter comprising at least one of: an amount-of-twist parameter, a shooting position parameter, a shooting angle parameter, a resolution parameter, and an optical flow parameter; and determining the rendering cost between the to-be-presented pictures based on the rendering sub-cost corresponding to each of the rendering-related parameters.

7. The method according to claim 5, wherein the method further comprises, before the determining the presentation order of the to-be-presented pictures based on the rendering cost between the to-be-presented pictures:

calculating, based on rendering-related parameters of the to-be-presented pictures, a rendering sub-cost corresponding to each of the rendering-related parameters, the rendering-related parameter comprising at least one of: an amount-of-twist parameter, a shooting position parameter, a shooting angle parameter, a resolution parameter, and an optical flow parameter; and determining the rendering cost between the to-be-presented pictures based on the rendering sub-cost corresponding to each of the rendering-related parameters.

8. The method according to claim 1, wherein the acquiring the original picture set encompassing the same scene comprises:

receiving a scene selection instruction, the scene selection instruction comprising geographical location information corresponding to the scene; and acquiring, based on the geographical location information, the original picture set corresponding to the geographical location information.

9. The method according to claim 8, wherein the method further comprises, after the acquiring the original picture set encompassing the same scene: performing a preprocessing operation on the original picture set, the preprocessing operation comprising at least any one of:

filtering out, from the original picture set, original picture having a image quality lower than a preset value; and correcting shooting positions of the original pictures in the original picture set to a normal shooting attitude.

10. A picture presentation apparatus, comprising:

at least one processor; and a memory storing instructions, the instructions when executed by the at least one processor, cause the at least one processor to perform operations, the operations comprising:

acquiring an original picture set encompassing a same scene;

selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points;

selecting a to-be-presented picture set from the reconstruction picture set, a number of the three-dimensional feature points included in the to-be-presented picture set being above a preset threshold;

determining a presentation order of to-be-presented pictures in the to-be-presented picture set, and generating a picture presentation sequence based on the presentation order of the to-be-presented pictures; and presenting pictures in the picture presentation sequence continuously, wherein the selecting a to-be-presented picture set from the reconstruction picture set, a number of the three-dimensional feature points included in the to-be-presented picture set being above a preset threshold, comprises:

selecting a reference to-be-presented picture from the reconstruction picture set, a number of three-dimensional feature points included in the reference to-be-presented picture being greater than a number of three-dimensional feature points included in any other reconstruction picture in the reconstruction picture set; and selecting a plurality of to-be-subsequently-presented pictures satisfying a first preset condition in sequence from the reconstruction picture set by using the reference to-be- presented picture, the first preset condition comprising: a number of different three- dimensional feature points included in the to-be-subsequently-presented picture and a to- be-subsequently-presented picture previously selected is greater than a number of different three-dimensional feature points included in a reconstruction picture that is not selected as a to-be-subsequently-presented picture and the to-be-subsequently-presented picture previously selected.

11. The apparatus according to claim 10, wherein the selecting, from the original picture set, the reconstruction picture set for reconstructing the three-dimensional structure of the scene comprises:

extracting scale- invariant feature transform (SIFT) keypoints in original pictures in the original picture set; and selecting, from the original picture set, the reconstruction picture set for reconstructing the three- dimensional structure of the scene based on a matching relationship between SIFT keypoints in the original pictures.

12. The apparatus according to claim 11, wherein the reconstructing the three-dimensional structure of the scene by using the reconstruction pictures in the reconstruction picture set, the three-dimensional structure of the scene comprising three- dimensional feature points, further comprises:

restoring a camera parameter based on SIFT keypoints in the reconstruction pictures in the reconstruction picture set, the camera parameter comprising an intrinsic camera parameter and an extrinsic camera parameter, and the intrinsic camera parameter comprising a focal length and a principal point offset; and reconstructing the three-dimensional structure of the scene based on the SIFT keypoints in the reconstruction pictures and the camera parameter.

13. The apparatus according to claim 10, wherein the determining the presentation order of the to-be-presented pictures in the to-be-presented picture set, and generating the picture presentation sequence based on the presentation order of the to-be-presented pictures comprises:
- determining the presentation order of the to-be-presented pictures based on an association relationship between attribute parameters of the to-be-presented pictures, the attribute parameter of the to-be-presented picture comprising a shooting position parameter and a shooting angle parameter; and
- generating the picture presentation sequence based on the presentation order of the to-be-presented pictures.

14. The apparatus according to claim 10, wherein the determining the presentation order of the to-be-presented pictures in the to-be-presented picture set, and generating the picture presentation sequence based on the presentation order of the to-be-presented pictures comprises:
- determining the presentation order of the to-be-presented pictures based on a rendering cost between the to-be-presented pictures, the rendering cost indicating a cost for inserting a transition picture between the to-be-presented pictures; and
- inserting a transition picture between every two neighboring to-be-presented pictures based on the presentation order of the to-be- presented pictures so as to generate the picture presentation sequence.

15. The apparatus according to claim 14, wherein the determining the presentation order of the to-be-presented pictures in the to-be-presented picture set, and generating the picture presentation sequence based on the presentation order of the to-be-presented pictures comprises:
- calculating, based on rendering-related parameters of the to-be-presented pictures, a rendering sub-cost corresponding to each of the rendering- related parameters, the rendering-related parameters comprising at least one of: an amount-of-twist parameter, a shooting position parameter, a shooting angle parameter, a resolution parameter, and an optical flow parameter; and
- determining the rendering costs between the to-be- presented pictures based on the rendering sub-cost corresponding to each of the rendering-related parameters.

16. The apparatus according to claim 15, wherein the determining the presentation order of the to-be-presented pictures in the to-be-presented picture set, and generating the picture presentation sequence based on the presentation order of the to-be-presented pictures comprises:
- inserting a virtual camera at at least one position between shooting positions of every two neighboring to-be-presented pictures based on the presentation order of the to-be-presented pictures, and performing an interpolation operation on the intrinsic camera parameter to obtain an intrinsic parameter of the virtual camera, the virtual camera comprising a virtual-camera imaging plane; and
- mapping, based on the intrinsic parameter of the virtual camera, three-dimensional feature points included in every two neighboring to-be-presented pictures to the virtual-camera imaging plane for inserting the transition picture, and generating the picture presentation sequence.

17. A non-transitory computer storage medium, storing computer readable instructions executable by a processor, wherein when the computer readable instructions are executed by a processor, the processor executes a picture presentation method, the picture presentation method comprising:
- acquiring an original picture set encompassing a same scene;
- selecting, from the original picture set, a reconstruction picture set for reconstructing a three-dimensional structure of the scene, and reconstructing the three-dimensional structure of the scene by using reconstruction pictures in the reconstruction picture set, the three-dimensional structure of the scene comprising three-dimensional feature points;
- selecting a to-be-presented picture set from the reconstruction picture set, a number of the three-dimensional feature points included in the to-be-presented picture set being above a preset threshold;
- determining a presentation order of to-be-presented pictures in the to-be-presented picture set, and generating a picture presentation sequence based on the presentation order of the to-be-presented pictures; and
- presenting pictures in the picture presentation sequence continuously,
- wherein the selecting a to-be-presented picture set from the reconstruction picture set, a number of the three-dimensional feature points included in the to-be-presented picture set being above a preset threshold, comprises:
- selecting a reference to-be-presented picture from the reconstruction picture set, a number of three-dimensional feature points included in the reference to-be-presented picture being greater than a number of three-dimensional feature points included in any other reconstruction picture in the reconstruction picture set; and
- selecting a plurality of to-be-subsequently-presented pictures satisfying a first preset condition in sequence from the reconstruction picture set by using the reference to-be- presented picture, the first preset condition comprising: a number of different three- dimensional feature points included in the to-be-subsequently-presented picture and a to- be-subsequently-presented picture previously selected is greater than a number of different three-dimensional feature points included in a reconstruction picture that is not selected as a to-be-subsequently-presented picture and the to-be-subsequently-presented picture previously selected.

* * * * *